United States Patent [19]

Hoshal

[11] Patent Number: 4,690,419
[45] Date of Patent: Sep. 1, 1987

[54] REFLECTORIZED SPLASH GUARD

[75] Inventor: Dale E. Hoshal, Minneapolis, Minn.

[73] Assignee: Luma Guard, Inc., West Minneapolis, Minn.

[21] Appl. No.: 766,824

[22] Filed: Aug. 16, 1985

Related U.S. Application Data

[63] Continuation-in-part of Ser. No. 485,662, Apr. 18, 1983, abandoned.

[51] Int. Cl.$^4$ .............................................. B62D 25/16
[52] U.S. Cl. ............................................ 280/154.5 R
[58] Field of Search .......................... 280/154.5 R, 159

[56] References Cited

U.S. PATENT DOCUMENTS

| | | | |
|---|---|---|---|
| 3,195,921 | 7/1965 | Robinson | 280/154.5 R |
| 3,237,963 | 3/1966 | Menzer | 280/154.5 R |
| 3,241,857 | 3/1966 | Goetz | 280/154.5 R |
| 3,337,238 | 8/1967 | Weasel, Jr. | 280/154.5 R |
| 3,497,238 | 2/1970 | Carlton | 280/154.5 R |
| 3,521,903 | 7/1970 | Rister | 280/154.5 R |
| 3,582,108 | 6/1971 | Carlton | 280/154.5 R |
| 3,822,897 | 7/1974 | Heath | 280/154.5 R |
| 4,061,352 | 12/1977 | Bagne | 280/154.5 R |
| 4,089,537 | 5/1978 | Pralutsky | 280/154.5 R |
| 4,103,918 | 8/1978 | Salden | 280/154.5 R |

Primary Examiner—Richard A. Bertsch
Attorney, Agent, or Firm—Merchant, Gould, Smith, Edell, Welter & Schmidt

[57] ABSTRACT

A reflectorized splash guard is disclosed. In a first embodiment, the splash guard (10) includes a plastic base member (11) having a reflectorized film (12) cooperatively connected thereto. In the preferred embodiment, the splash guard (10) has a top border (15), bottom border (16), right side border (17) and left side border (18) that are free of the reflectorized film (12). In a second embodiment, a reflectorized splash guard (10) includes a base member (31) having an inner cavity (32). An insert (36) having a reflectorized film (37) cooperatively connected thereto is inserted in the cavity and retained by an opening (33).

2 Claims, 7 Drawing Figures

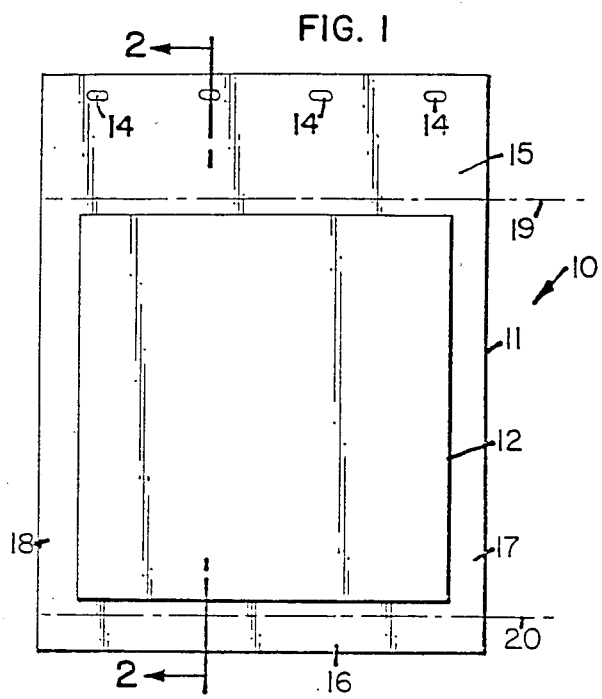
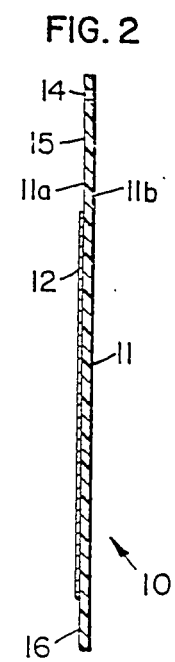
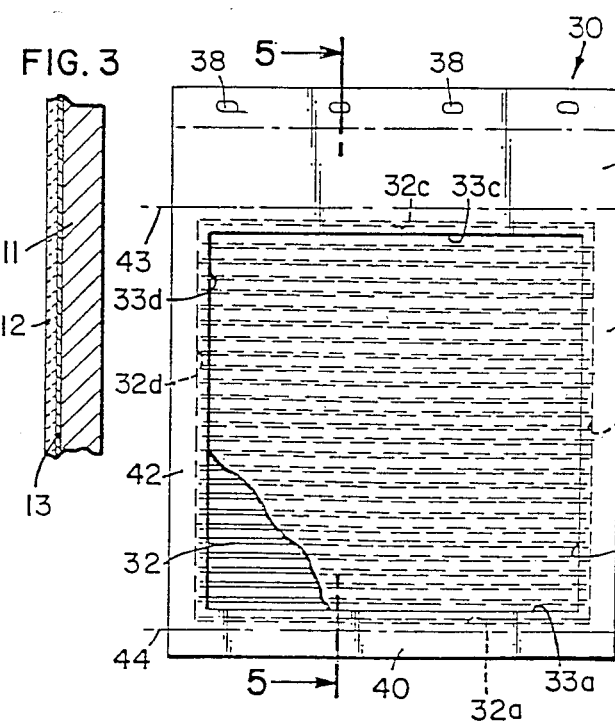
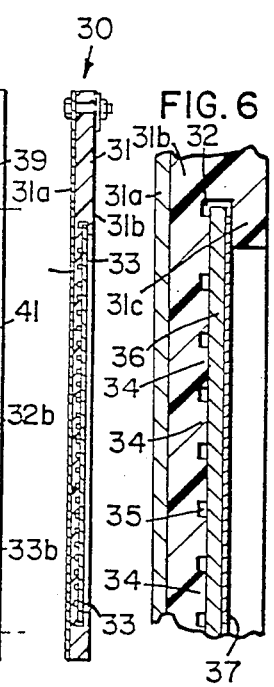

REFLECTORIZED SPLASH GUARD

This application is a continuation-in-part of U.S. application Ser. No. 485,662, filed Apr. 18, 1983, which was abandoned on Feb. 20, 1986.

FIELD OF THE INVENTION

This invention relates generally to splash guards or mud flaps for use with over the road vehicles, and more particularly to reflectorized splash guards or mud flaps that may be imprinted with graphics.

DESCRIPTION OF THE PRIOR ART

Splash guards are required by law in a number of states for certain vehicles, e.g. trucks. The splash guards have typically been made from rubber or cord reinforced rubber. With the recent advances in the plastics industry, more and more splash guard manufacturers are switching to a plastic, i.e. polyethylene, type splash guard.

In addition to functioning as a splash guard, the splash guards have been used to carry certain graphical messages. These messages may take the form of advertisements, logos, art, etc.

The prior art splash guards were not reflectorized. This lack of having a reflective surface did not provide a splash guard with increased safety characteristics. A reflectorized surface, within the light zone of headlights, can be seen up to 1,000 yards away.

Realizing the advantages of a reflectorized splash guard, attempts have been made to adhere a reflectorized film to rubber splash guards. To date, the inventor is unaware of any successful lamination of a reflectorized film to rubber splash guards.

The present invention addresses the shortcomings of the prior art splash guards and provides in a first embodiment for a reflectorized plastic splash guard and in a second embodiment for a reflectorized insert to be carried by a rubber splash guard.

SUMMARY OF THE INVENTION

The present invention provides for a reflectorized splash guard for use on an over the road vehicle. In a first embodiment, the splash guard includes a plastic base member having first and second surfaces. Means are provided for operatively connecting the base member to the vehicle. A reflectorized film is cooperatively connected to the first surface of the base member, thereby forming a reflectorized splash guard. In a preferred embodiment, the reflectorized film is cooperatively connected to a polyethylene base member by a polyethylene adhesive. The reflectorized film is Scotchlite 581-70. In addition, graphics may be printed on the reflectorized film.

In a preferred embodiment, the base member has a border along the top, bottom and sides that is free from from the reflectorized film.

In a second embodiment, the reflectorized splash guard is of the type adapted to receive a reflectorized insert. The splash guard includes a top member having a top end and bottom end and having an inner cavity. The inner cavity has an opening sized smaller than the inner cavity and larger than the insert, whereby the insert is insertable into the inner cavity and is retained in the inner cavity by the opening. In addition, means for operatively connecting the base member to the vehicle is provided.

In a preferred embodiment, the base member includes a first layer of cord reinforced rubber vulcanized to a second layer of rubber, the inner cavity being formed in the second layer. Further, the base member has a plurality of spaced rib members positioned proximate the inner cavity.

In both the first and second embodiments, a splash guard effectively incorporates a reflectorized film, thereby providing a reflectorized splash guard.

BRIEF DESCRIPTION OF THE DRAWINGS

FIG. 1 is a front elevational view of a reflectorized splash guard according to this invention;

FIG. 2 is a cross-sectional view of the reflectorized splash guard of FIG. 1, taken generally along the line 2—2;

FIG. 3 is an enlarged cross-sectional view of the reflectorized splash guard of FIG. 2;

FIG. 4 is a front elevational view of another embodiment of the reflectorized splash guard according to this invention;

FIG. 5 is a cross-sectional view of the splash guard of FIG. 4, taken generally along the lines 5—5.

FIG. 6 is an enlarged cross-sectional view of the reflectorized splash guard of FIG. 5.

DETAILED DESCRIPTION OF THE INVENTION

Figure 7:
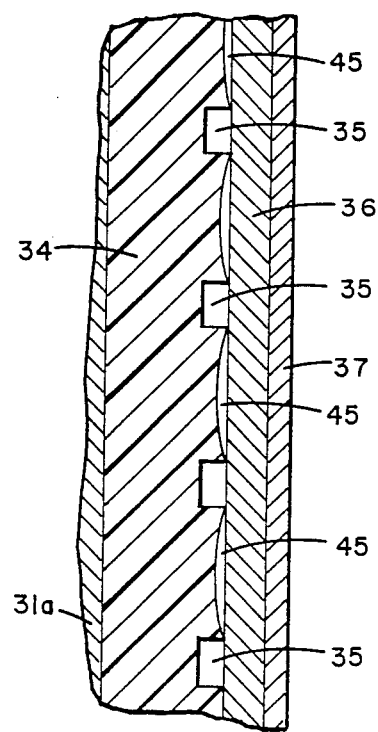
FIG. 7 is an enlarged cross-sectional view of the reflectorized splash guard of FIG. 5, showing the concave shape of the supporting ribs.

Referring to the drawings, wherein like numerals represent like parts throughout the several views, there is generally disclosed in FIGS. 1-3 at 10 a reflectorized splash guard. The splash guard 10 includes a plastic base member 11 having a first surface 11a and a second surface 11b. In a preferred embodiment, the plastic member 11 is made from polyethylene. A reflectorized film 12 is cooperatively connected to the first surface 11a of the base member 11. In a preferred embodiment, the reflectorized film is Scotchlite 581-70 which may be purchased from the 3M Company, Saint Paul, Minn. The reflectorized film 12 is cooperatively connected to the base member 11 by an adhesive, preferably a polyethylene adhesive. When using Scotchlite 581-70 reflectorized film, the reflectorized film comes with a pressure sensitive adhesive adhered to one side of the reflectorized film. A removable release paper is placed over the adhesive. To cooperatively connect the reflectorized film 12 to the base member 11, the release paper is simply removed, and the adhesive/reflectorized film is pressed against a base member 11.

The splash guard 10 is typically mounted to the vehicle behind the vehicle's rear wheels. Second surface 11b of the base member 11 is towards the wheels, with the reflectorized film 12 being away from the wheels and visible to traffic behind the vehicle.

In a preferred embodiment, graphics, such as advertisement, logos or art work, may be imprinted on the reflectorized film 12 before the reflectorized film 12 is connected to the base member 11. One method of imprinting graphics on the reflectorized film 12 is to use silk-screening. It is understood that other suitable methods, well-known in the art, may be used to imprint graphics on the reflectorized film 12. In silk-screening a design on the reflectorized film 12, a translucent ink is used which reduces, but does not totally destroy the reflectivity of the reflective film 12.

A novel feature of the present invention relates to the method by which the splash guard herein described is actually manufactured. The graphic information must be transferred to the reflectorized film 12 in a particular manner in order to preserve the reflectivity of the reflectorized film 12 and to provide the durability required in the harsh highway environment in which the present invention is typically used.

In the preferred embodiment, the graphic information is transferred to the splash guard by means of a stencil. The stencil may be created photographically by using a chromaline film. The graphics transferral process is begun by first stretching tautly a cloth screen across a flat wooden frame. Next, a photosensitive emulsion having a high viscosity is applied to the screen, thereby coating the screen's entire surface. The emulsion is allowed to dry on the screen and then a "positive" is placed on the screen. The "positive" is an outline of the graphic information which exactly reproduces the tones and shapes which are to be included in the final graphic display. Once the "positive" is secured in place on the dried screen so as to cover a portion of the dried emulsion, the entire assembly is exposed to a light source. The effect of the light source is to cause those parts of the photosensitive emulsion which are exposed to the light to become water insoluble, whereas those portions of the emulsion which are masked by the "positive", and are therefore not exposed to the light source, remain water soluble.

After the entire screen is exposed to the light source, the screen is washed with warm water, thereby removing those parts of the emulsion which have been masked by the "positive". Once the screen is washed, it is again allowed to dry and any area on the screen which is not intended to be covered with ink is filled in with a water soluble screen filling material. The use of the screen filling material permits covering any small defect in the emulsion surface which might cause a pin hole or a line or other irregularity to appear on the final printed film. Once the screen filling material has dried, the stencil is ready to be used for printing.

In order to actually print onto the reflectorized film, the prepared screen is placed in contact with a reflectorized film and ink is applied to the screen by means of a rubber blade. Ink is placed on the screen and the blade is swept across the screen, thereby forcing ink through those gaps created in the emulsion by the stenciling process and thus depositing ink on the reflectorized film in the desired pattern. The ink used must be translucent and is typically cured by a heating process. The ink used must have both the quality of possessing the proper pigmentation in order to give the color desired, yet be sufficiently translucent so as not to affect the intensity or reflectivity of the film surface on which it is desposited. The stenciling process may be repeated any number of times, each time applying a new color of ink, in order to create a multi-color graphic presentation. Each new color may be added only after the preceding color has been allowed to dry or cure completely.

The reflective sheeting or film utilized must be of the wide angularity, enclosed lens, retroreflective type. The retroreflective material contains glass beads deposited on a film so as to increase the albedo throughout a viewing angle of 180°. The film material is a vinyl laminate which is receptive to an ink coating. In a preferred embodiment, the reflective sheeting used is manufactured by Avery International and is sold under the trade name Fasign ® Reflective Sheeting. The sheeting must be resistant to salt spray and various chemicals, such as Toluene, kerosene, turpentine, methy alcohol and gasoline which are commonly encountered in an automotive environment. Since the graphic display is used oudoors, and in close association with mechanical equipment which generates heat, the film must be able to withstand a temperature variation of between −40° F. to 180° F. The film is applied to the splash guard base material 15 at a temperature of 50°.

The adhesive used to attach the sheeting to the base material 15 has a rubber base. In the preferred embodiment, the base 15 is a high density polyethylene sheet which works well with a rubber base pressure-sensitive adhesive. The adhesive may be applied in temperature as low as 40° F. and the temperature variation in service may range from −20° F. to 120° F. The adhesive must also be resistant to the chemicals encountered in the automotive environment.

A plurality of mounting holes 14 are formed on the top portion of the base member 11. These holes may be used to mount the splash guard 10 to the vehicle. Typically a bolt and nut combination would be used to secure the splash guard 10 to the vehicle, however, it is understood that any suitable method well-known in the art may be used. The base member 11 has a top border 15, bottom border 16, right side border 17 and left side border 18 that are all free of the reflectorized film 12. When the splash guard 10, is mounted to a vehicle, there is a flex line, indicated generally as 19, where the splash guard 10 tends to bend back and forth as the vehicle moves. For a splash guard 10 that is approximately 24 inches in width and 30 inches in length, the flex line 19 is from 6 to 8 inches from the top edge of the base member 11. Therefore, there is no reflectorized film 12 along this flex line 19. Otherwise, the reflectorized film 12 would tend to crack, allowing moisture to penetrate behind the reflectorized film 12, causing the reflectorized film 12 to peel off of the base member 11.

There is also another stress line, approximately 2 to 3 inches from the bottom edge of the base material, which is caused by flying foreign objects such as rocks which hit the second surface 11b of the base member 11. This tends to create bubbles in the reflectorized film 12 along this line. Therefore, the bottom border 16 is also free from the reflectorized surface, so that no bubbles and/or cracks develop. This stress line has generally been designated as 20, as shown in FIG. 1.

Referring now to FIGS. 4 through 6, there is generally designated at 30 a second embodiment of a reflectorized splash guard. A splash guard 30 includes a base member 31. A base member 31 includes a first layer of cord reinforced rubber 31a vulcanized to a second layer of rubber 31b. It is understood that the base member 11 may be constructed with only a single layer of rubber forming both the first and second layers. In addition, it is understood that other suitable materials besides rubber and cord reinforced rubber may be used.

The second layer of rubber 31b has formed therein an inner cavity 32. The inner cavity 32 has an opening 33. The opening 33 is sized smaller than the inner cavity 32. The opening 33 is smaller than the inner cavity 32 by the size of the flange 31c of the second layer 31b. This flange 31c is shown in FIG. 6. As shown in FIG. 4, the inner cavity 32 is in the general shape of a rectangle. The edges of the inner cavity 32 are shown by the hidden lines 32a, 32b, 32c and 32d. The four edges of the opening 33 are designated by 33a, 33b, 33c and 33d. It can therefore be seen that the flange 31c extends around all four sides of the opening 33.

A plurality of ribs 34 and corresponding cavities 35 are formed in the second rubber layer 31b. In a preferred embodiment, the ribs 34 are spaced and parallel to one another. The surface of the ribs 34 comes into contact with insert 36, the pressure of ribs 34 assisting in securing insert 36 in place. Additionally, as can best be seen in FIG. 7, the tips of ribs 34 are formed so as to be slightly concave in shape, thus forming a suction cup 45 at the end of each rib 34. Prior to insertion of insert 36 into cavity 32, the ribs 34 actually extend slightly into the area which will be occupied by insert 36. When insert 36 is forced into the cavity 32 the ribs 34 are compressed slightly and the concave tip 45 of each rib 34 acts as a suction cup thereby gripping insert 36.

An insert 36 has size that is larger than the opening 33 and a size that is preferably less than or equal to the size of the inner cavity 32. The insert may be any suitable plastic, such as polyethylene, or metal, or other suitable material. A reflectorized film 37, the same as the reflectorized film 12 in the first embodiment, is adhered to the insert 36 in the same manner that reflectorized film 12 is cooperatively connected to the base member 11 in the first embodiment.

The insert 36 is flexible, so that it may be slightly deformed to be inserted through the opening 33 into the inner cavity 32. The insert 36 is retianed in the inner cavity 32 by the smaller opening 33. In addition, the plurality of ribs 34 and cavities 35 assist in holding the insert in place by acting somewhat similar to a suction cup. Another function of the ribs 34 is to absorb the shock of any rocks that may hit the first layer 31a.

The splash guard 30 has mounting holes 38, which are similar to mounting holes 14 of the reflectorized splash guard 10.

The reflectorized splash guard 30 has a flex line 43 and stress line 44 similar to the flex line 19 and stress line 20 of the splash guard 10. The second layer 31b has a top border 39, bottom border 40, right side border 41, and left side 42. The borders serve the same function as that previously described for the borders of the reflectorized splash guard 10. However, since the second layer 31b has no reflectorized film adhered thereto, the borders define areas under which there is no reflectorized insert 36 underneath in the inner cavity 32. Therefore, the insert 36 and the corresponding reflecting reflectorized film 37 is not subject to the flex and stress along lines 43 and 44, thereby minimizing any peeling or cracking of a reflectorized film 37.

In addition to having the insert 36 retained by the opening 33 in inner cavity 32, it may be desirable to further secure the insert 36 to the base member 31 by means of a nut and bolt combination or other similar fastening devices.

The reflectorized splash guards 10 and 30 provide for a reflectorized splash guard that is highly visible at much greater distances than prior splash guards. This greatly increases the safety factor, especially for vehicles that may be stalled along the roadway and have lost their running lights. In addition, when graphics are added to the reflectorized film, this provides for a very effective and cost efficient way of communicating with the general public that may be traveling along the same roads as the motor vehicle having the splash guards.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follow in the spirit and broad scope of the appended claims are included.

I claim:

1. A splash guard for an over the road vehicle, said splash guard of the type adapted to receive a reflectorized insert, said splash guard comprising:
    (a) a base member having a top end and a bottom end and having an inner cavity, said inner cavity having an opening sized smaller than said inner cavity and larger than the insert, the inner cavity being aligned with a series of parallel ribs, each rib having a concave tip, the insert being insertable in the said inner cavity and retained in said inner cavity by means of a suction effect, the insert being retained within the inner cavity by means of the concave tip of each rib serving as a suction cup which grips the insert; and
    (b) means for operatively connecting said base member to the vehicle.

2. A splash guard according to claim 1 wherein the ribs protrude into to inner cavity of the base member so as to exert pressure against the insert when the insert resides within the cavity, the pressure thus exerted by the ribs thereby tending to retain the insert within the cavity.

* * * * *